United States Patent
Crandall

[19]

[11] Patent Number: 5,938,320
[45] Date of Patent: Aug. 17, 1999

[54] ENHANCED ILLUMINATED POLYMERIC INDICATOR EMPLOYED IN A MIRROR HOUSING OF AN AUTOMOTIVE VEHICLE

[75] Inventor: Robert M. Crandall, Capac, Mich.

[73] Assignee: Harman Automotive, Inc., Farmington Hills, Mich.

[21] Appl. No.: 08/820,122

[22] Filed: Mar. 19, 1997

[51] Int. Cl.⁶ .................................................. B60Q 1/00
[52] U.S. Cl. ........................... 362/494; 362/27; 362/140; 362/249; 362/468; 362/475; 362/478; 362/511; 362/545; 362/800
[58] Field of Search .................................. 362/249, 511, 362/545, 800, 494, 27, 140; 340/468, 475, 478

[56] References Cited

U.S. PATENT DOCUMENTS

| | | | |
|---|---|---|---|
| 5,014,167 | 5/1991 | Roberts | 362/83.1 |
| 5,059,015 | 10/1991 | Tran | 359/844 |
| 5,313,335 | 5/1994 | Gray et al. | 359/839 |
| 5,402,103 | 3/1995 | Tashiro | 340/475 |
| 5,436,741 | 7/1995 | Crandall | 359/15 |
| 5,587,699 | 12/1996 | Faloon et al. | |
| 5,669,705 | 9/1997 | Pastrick et al. | 362/83.1 |
| 5,788,357 | 8/1998 | Muth et al. | 362/83.1 |

FOREIGN PATENT DOCUMENTS

0738627A2  4/1996  European Pat. Off. .

OTHER PUBLICATIONS

"Luminex Solidstate Backlighting" Lumintex, Inc., 1996.

*Primary Examiner*—Sandra O'Shea
*Assistant Examiner*—John A. Ward
*Attorney, Agent, or Firm*—Dykema Gossett PLLC

[57] ABSTRACT

A mirror assembly has a housing that defines a cavity therein. A mirror is disposed within the cavity. The mirror transmits and reflects at least a portion of the light incident thereupon. A light guide has a first surface spaced a predetermined distance apart from the second surface. The light guide is placed within the mirror housing. A plurality of light sources are coupled to the light guide and direct light between the first and second surfaces. Light is reflected out of the light guide and transmitted through the mirror to provide an indicator function on the mirror.

18 Claims, 2 Drawing Sheets

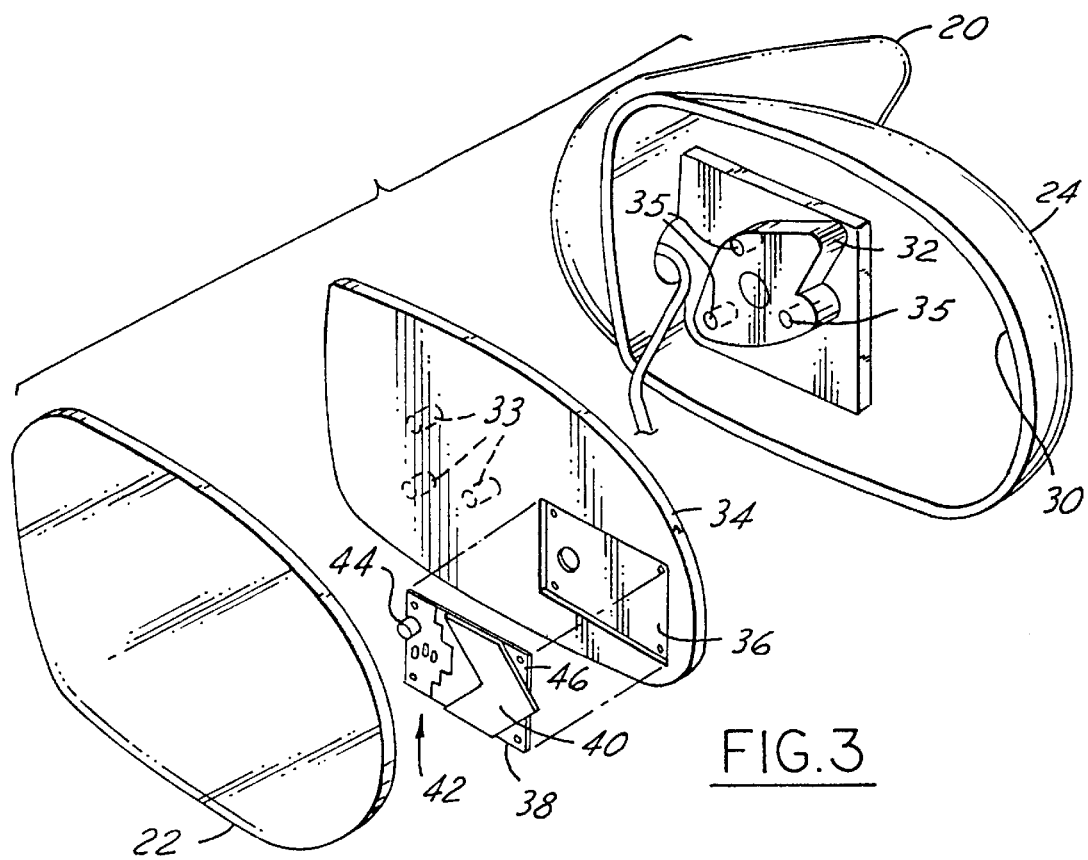
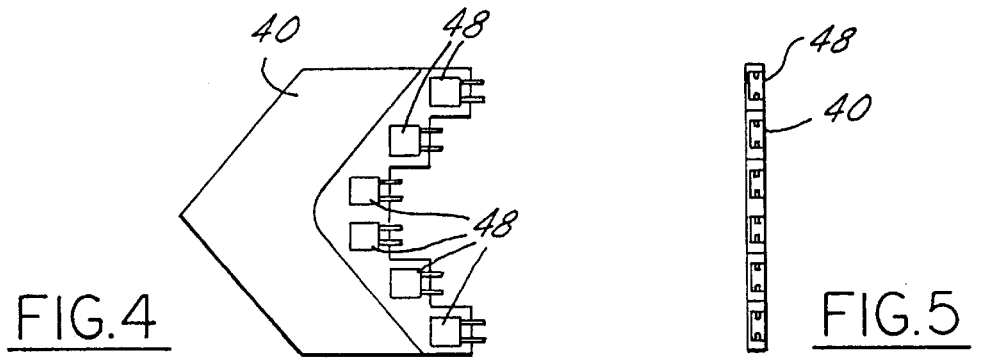
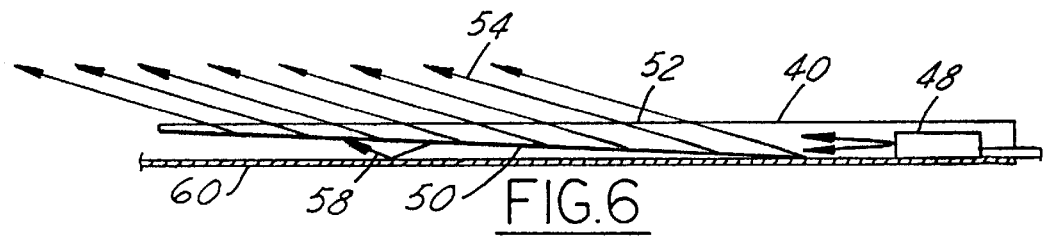

ENHANCED ILLUMINATED POLYMERIC INDICATOR EMPLOYED IN A MIRROR HOUSING OF AN AUTOMOTIVE VEHICLE

BACKGROUND OF THE INVENTION

The present invention relates generally to exterior mounted rear view mirrors for motor vehicles and, more specifically, to rear view mirrors having indicators incorporated into the mirror.

It is highly desirable to provide adjacent vehicles with information concerning a vehicle operator's intentions. Vehicles are required to include such indicators as brake lights, turn signals and hazard indicators. Turn signals, for example, are commonly mounted only on the very front and rear portions of the vehicle. In many instances a driver in a second vehicle adjacent to a first vehicle may not be able to adequately view the turn signals of the first vehicle due to his relative position to the front and rear of the first mentioned vehicle.

Providing additional information to adjacent vehicles has been the subject of several patents. One of my commonly assigned earlier patents, U.S. Pat. No. 5,436,741 uses a holographic film coupled to a mirror surface. An incandescent bulb placed within the mirror housing shines through a hologram. One problem with signal mirrors using an incandescent light source is that incandescent light sources generate a large quantity of heat. A sufficient amount of space must be left around the light source so that heat may be dissipated within the mirror housing without causing overheating. Overheating may cause damage to the mirror assembly or reduce the life of the signaling apparatus. Such a configuration is not suitable for applications requiring thin mirror housings.

Another known type of signal mirror replaces the incandescent light source with light emitting diodes to evenly distribute the light over an indicator area. A series of light reflectors are placed behind each of the diodes. Between the diodes and the indicator surface a light diffuser is used to help spread the light over the indicator surface. Light emitted from the diodes shine directly through the mirror in much the same manner as an incandescent light source. Commonly the light emitting diodes used generate a significant amount of heat. To properly spread the light pattern, the light emitting diodes must be spaced a pre-determined distance from the light diffuser. Also, space must be left for the light reflectors which are typically formed of a metallic material to reflect the light from the light emitting diodes. Such a configuration also has a package depth which is too deep for some mirror applications.

It would therefore be desirable to provide an indicator mirror having a reduced package depth that may be easily incorporated into a mirror housing.

SUMMARY OF THE INVENTION

It is therefore an object of the present invention to provide an improved indicator mirror that is less expensive to manufacture and more space efficient than previously known indicator mirrors.

According to one aspect of the invention, a mirror assembly is disclosed that includes a mirror housing defining a cavity and a mirror disposed within the cavity. The mirror transmits and reflects at least a portion of the light incident thereon. A light guide is disposed within the mirror housing that includes a first surface spaced a predetermined distance from a second surface. A plurality of lights sources are coupled to the light guide so that light rays from the light sources are directed between the first and second surfaces. The second surface reflects light emitted from the light source and directs the reflected light rays toward the first surface where at least a portion of the reflected light rays is transmitted through the first surface and through the mirror.

In one aspect of the invention the light guide may be formed of a polymeric material. The light sources may be light emitting diodes molded within the light guide.

In another aspect of the invention a reflecting surface may be mounted proximate to a reflecting surface to reflect light not reflected by the second surface to increase the light output of the indicator.

One advantage of the present invention is that the indicator assembly is very thin with respect to other known signal mirrors. The thin configuration allows more freedom in the design of mirror housings. That is, the thickness of mirror housings do not have to be increased to contain the light source beyond that normally provided for the adjustment mechanism.

BRIEF DESCRIPTION OF THE DRAWINGS

Other features and advantages of the present invention will become apparent from the following detailed description which should be read in conjunction with the drawings in which.

FIG. 3 is an exploded view of a mirror housing having an indicator;

FIG. 4 is a front view of an indicator assembly;

FIG. 5 is an end view of an indicator assembly showing the relative thickness of the indicator assembly; and, FIG. 6 is a cross sectional view of the indicator assembly showing the path of light through the indicator assembly.

DETAILED DESCRIPTION OF THE PREFERRED EMBODIMENT

Figure 1:
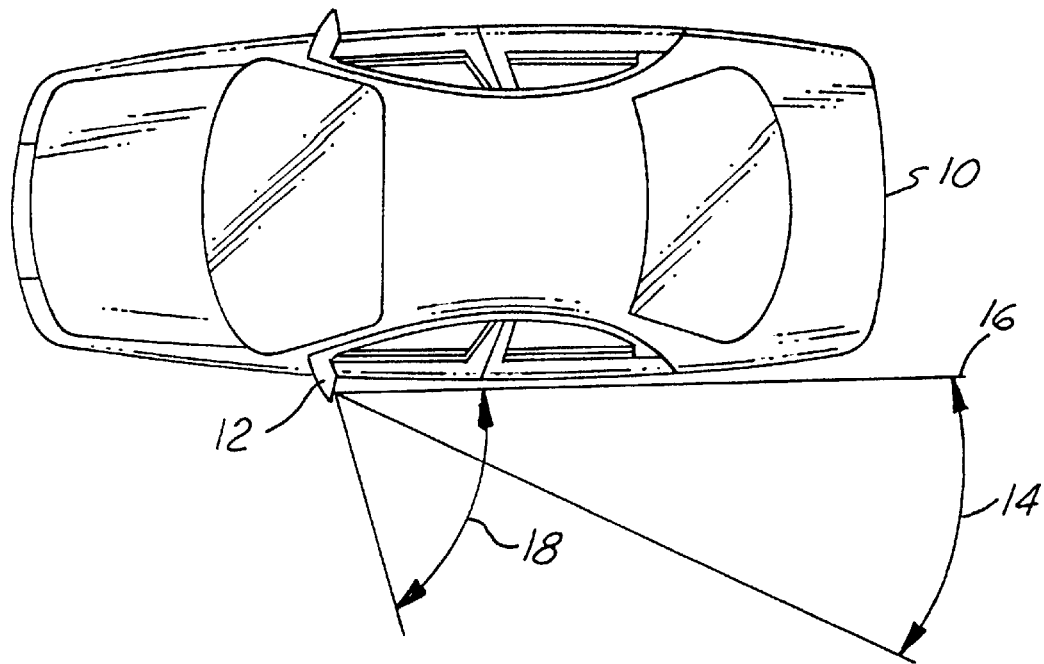
FIG. 1 is a top view of a motor vehicle having signal mirrors according to the present invention and a diagrammatic representation of light emitted from the mirror.

Referring now to the drawings, like reference numerals are used to identify identical components in the various views. Although the invention will be illustrated in the context of a turn signal, it will be appreciated that this invention may be used with other indicator functions such as brake indicators or hazard indicators. Of course, more than one function may be incorporated into an indicator assembly either independently or concurrently.

Referring now to FIG. 1, an automotive vehicle 10 has a signaling mirror assembly 12. The signaling mirror assembly 12 generates a signal which is displayed at an angle 14 with respect to a longitudinal axis 16 of automotive vehicle 10. The plane of the mirror 22 is at an angle 18 with respect to a longitudinal axis 16, although in some vehicle, the angle may be about 90°. Angle 14 may be adjusted according to the individual design needs of automotive vehicle 10.

Figure 2:
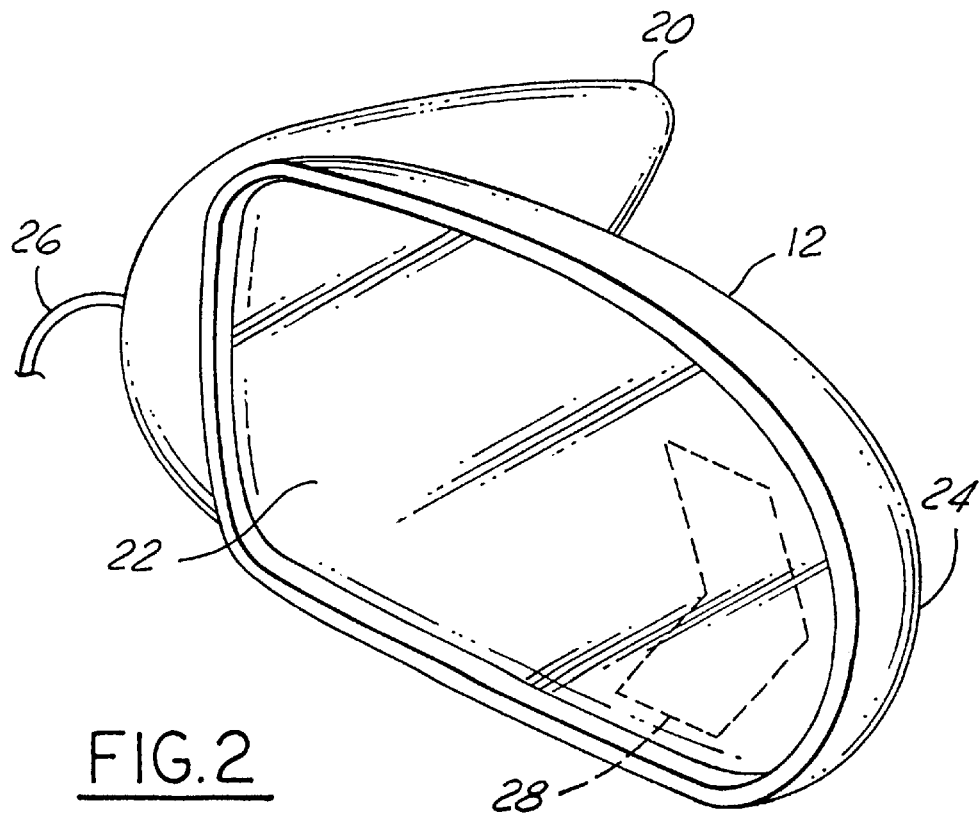
FIG. 2 is a perspective view of a mirror housing containing a signal indicator.

Referring now to FIG. 2, signaling mirror assembly 12 is mounted to automotive vehicle 10 by an applique 20. Applique 20 may be fixedly mounted to housing 24. Applique 20 may also be mounted to applique 24 in a breakaway mirror assembly. Both methods for mounting an applique to a housing 24 are commonly known in the art and maybe implemented in a signal mirror. A mirror 22 is mounted within a housing 24. A wire 26 is used to provide power and adjustment control to mirror 22. An indicator 28 shown in phantom lines behind mirror 22 may be illuminated to provide a signal to drivers in an adjacent automobile. As shown, indicator 28 is in the shape of a chevron and is visible only when the indicator is illuminated. Applique 20 and housing 24 are preferably formed of a polymeric material to minimize its weight.

Mirror 22 is preferably formed of a piece of glass that has both reflective and transmissive properties. The mirror glass may have a reflectivity of up to 70%, but preferably has a reflectivity less than that. Current federal regulations require at least 55% reflectivity, but lower reflectivities are conceivable. The mirror glass preferably has a transmissivity of approximately 60% of a selected frequency range of the spectrum of visible light but of at least 40% of the selected frequency range. Commonly, signal mirrors use light in the red frequency range.

Referring now to FIG. 3, an exploded view of signaling mirror assembly 12 is shown. Housing 24 generally defines a cavity 30 therein. Cavity 30 encloses an electric mirror actuator 32. Electric mirror actuator 32 is mounted to housing 24. The actuator shown is a power actuator, but many manually operated actuator may also be used.

Electric mirror actuator 32 is fixedly coupled to a base plate 34 in a conventional manner. For example, receivers 33 may be integrally formed on base plate 34 to receive a fastener (not shown) that is affixed to or formed into holes 35 of base plate 34. Base plate 34 is preferably fixedly coupled to mirror 22. Commonly, an adhesive may be used to bond base plate 34 to mirror 22. To adjust the mirror, electric mirror actuator 32 is moved, which in turn causes base plate 34 to move. The movement of base plate 34 causes mirror 22 to be adjusted.

Base plate 34 has a recess 36 formed therein. Recess 36 is sized to receive an indicator assembly 38 which may be inserted before mirror 22 is coupled to base plate 34. The depth of recess 36 allows mirror 22 to lay flush against base plate 34.

Indicator assembly 38 generally has a light guide 40, a group of electrical components 42 and a light sensor 44. Light guide 40, group of electrical components 42, light sensor 44 and the light source such as a plurality of LED's 48 may all be mounted to a circuit board 46. Light guide 40 will be described in further detail in FIGS. 4 through 6. Group of electrical components 42 may for example be a plurality of resistors and a transistor to be used in conjunction with the plurality of LED's 48. The size and number of resistors depends upon the amount of voltage provided as well as the type of LED's 48 provided. Light sensor 44 is common in the industry.

Light sensor 44 may for example be a photodiode or other commonly known light sensor. In daylight, more illumination is required to be given off by the indicator. During night operation less illumination from indicator is required. The amount of illumination required can be controlled with feedback from light sensor 44.

Referring now to FIGS. 4, 5 and 6, LED's 48 are shown with respect to light guide 40. LED's 48 may be integrally molded into light guide 40. LED's 48 may also be epoxy mounted to the light guide.

LED's 48 direct light within the thickness of the light guide 40. In one constructed embodiment, light guide 40 at the thickest point of its wedge-shaped cross section is only two millimeters thick. The thickness decreases as the distance from the LED's increase. Light rays emitted by LED's bounces off a back (second) surface 50 of light guide 40 and leaves light guide through front (first) surface 52. One advantage of light emitting diode is that the light emitted is generally in one direction. Nearly the full output of the LED may be coupled to light guide 40.

It is preferred that the indicator is a predetermined color such as red. One way in which to achieve red is to use red light emitting LED's. Another way in which red light may be achieved is to paint back surface 50 red. Another way that red color may be achieved is by molding light guide 40 out of a red plastic material.

The angle of back surface 50 with respect to front surface 52 may be adjusted to achieve the desired angle of reflected light 54 from back surface 50. Most of the light rays generated by the LED's reflect from back surface 50. Some light rays may also be scattered by back surface 50 and leave light guide 40. Scattered light 58 is reflected back through light guide 40 by a reflecting surface 60. Reflecting surface 60 is close to back surface 50 of light guide 40. Reflecting surface 60 may for example be a thin sheet of white or foil-like reflective plastic film attached to the circuit board onto which the light guide 40 is mounted. Reflective surface 60 may also be directly coupled to back surface 50.

By directing light into the thickness of light guide 40, an even distribution of light across indicator 28 has been achieved since most of the light emitted by the LED's 48 is transmitted down light guide 40 until it is reflected out of the first surface 52. These enhanced results have been achieved by using only six LED's.

LED's are preferably cool operating temperature LED's. Cool operating temperature LED's are commonly known in the art. Cool operating temperature LED's may be placed in close contact with the preferred polymer material of light guide 40. Cool operating temperature LED's do not cause an increased heat build up within mirror housing 24.

In operation, the indicator assembly 38 is coupled in parallel to the indicator function that it emulates. For example, indicator may be coupled to the turn signal indicator or a brake lamp. Multiple functions are also possible. Multiple functions may be implemented by using two or more light guides individually illuminated when their associated function is operable. Multiple functions may also be implemented using a hierarchical approach. That is, the indicator may be used for one function but may be superseded if another function is required.

While the best mode for carrying out the present invention has been described in detail, those familiar with the art to which this invention relates will recognize various alternative designs and embodiments for practice in the invention as defined by the following claims:

What is claimed is:

1. A mirror assembly comprising:
   a mirror housing defining a cavity;
   a mirror disposed within said cavity, said mirror transmitting and reflecting at least a portion of light incident thereon;
   a light guide having a first surface and a second surface, said first surface spaced a predetermined distance apart from a second surface; and
   a plurality of light sources coupled to said light guide, said light sources directing light rays between said first and second surfaces;
   said second surface reflecting light rays emitted from said light sources and directing light rays between said first and second surfaces;

said second surface reflecting light rays emitted from said light sources and directing the reflected light rays toward the first surface where at least a portion of the reflected light rays are transmitted through said surface and through said mirror;

said light guide having a generally wedge shaped cross section; said predetermined distance decreasing proportionally with respect to the distance from said light sources.

2. A mirror assembly as recited in claim 1, wherein said second surface reflects said light rays at a predetermined angle.

3. A mirror assembly as recited in claim 1, wherein said first surface is disposed generally parallel to a plane of said mirror.

4. A mirror assembly as recited in claim 1, wherein said second surface is positioned a predetermined angle with respect to said mirror.

5. A mirror assembly as recited in claim 1, wherein said light guide is formed of a polymeric material.

6. A mirror assembly as recited in claim 1, wherein said second surface has a colored layer.

7. A mirror assembly as recited in claim 6, wherein said colored layer is applied to said second surface.

8. A mirror assembly as recited in claim 1, wherein said light source comprises light emitting diodes.

9. A mirror assembly as recited in claim 8, wherein said light emitting diodes comprise low operating temperature diodes.

10. A mirror assembly as recited in claim 1, wherein said light sources are integrally molded to said light guide.

11. A mirror assembly as recited in claim 1, further comprising a reflective surface disposed adjacent to said second surface.

12. A mirror assembly comprising:

a mirror housing;

a mirror base coupled within said housing;

a mirror coupled to said mirror base, said mirror transmitting and reflecting at least a portion of light incident thereon;

an indicator assembly coupled to said mirror base having,
a light guide having a first surface and a second surface, said first surface spaced a predetermined distance apart from a second surface;
a plurality of light sources coupled to said light guide, said light sources directing light rays between said first and second surfaces;
said second surface reflecting light rays emitted from said light sources and directing the reflected light rays toward the first surface where at least a portion of the reflected light rays are transmitted through said first surface and through said mirror; and
said mirror base having a recess formed therein, said recess sized to receive said indicator assembly.

13. A mirror assembly as recited in claim 12, further comprising a circuit board, said light guide and light sources being connected to said circuit board.

14. A mirror assembly as recited in claim 12, further comprising a light sensor, said light sensor mounted to said circuit board and electrically coupled to said light sources.

15. A mirror assembly as recited in claim 14, wherein said light sensor controls the output of said light sources.

16. A mirror assembly as recited in claim 12, wherein said light sources comprise light emitting diodes.

17. A mirror assembly as recited in claim 16, wherein said light emitting diodes comprise low operating temperature diodes.

18. A mirror assembly as recited in claim 12, wherein said light guide has a generally wedge shaped cross section; said predetermined distance decreasing proportionally with respect to the distance from said light sources.

* * * * *

UNITED STATES PATENT AND TRADEMARK OFFICE
CERTIFICATE OF CORRECTION

PATENT NO. : 5,938,320
DATED : August 17, 1999
INVENTOR(S) : Crandall

It is certified that error appears in the above-identified patent and that said Letters Patent is hereby corrected as shown below:

Claim 1, column 4, cancel lines 65-68 "said second surface..said second surfaces;

Claim 1, column 5, line 4, insert --first-- before "surface"

Signed and Sealed this

Twenty-eighth Day of December, 1999

Attest:

Q. TODD DICKINSON

*Attesting Officer*          *Acting Commissioner of Patents and Trademarks*